(No Model.) 2 Sheets—Sheet 1.

P. H. ADAMS, Jr. & O. T. X. ADAMS.
APPARATUS FOR USE IN DECOMPOSING METALLIC SALTS AND DESULPHURIZING ORES.

No. 399,118. Patented Mar. 5, 1889.

(No Model.) 2 Sheets—Sheet 2.
P. H. ADAMS, Jr. & O. T. X. ADAMS.
APPARATUS FOR USE IN DECOMPOSING METALLIC SALTS AND DESULPHURIZING ORES.

No. 399,118. Patented Mar. 5, 1889.

Witnesses,

Inventors,
Phineas H. Adams Jr.
Onesmas T. X. Adams,
By Banning & Banning & Payson,
Att'ys.

UNITED STATES PATENT OFFICE.

PHINEAS H. ADAMS, JR., AND ORSEMAS T. X. ADAMS, OF CHICAGO, ILLINOIS, ASSIGNORS TO MELINDA PECK, OF SAME PLACE.

APPARATUS FOR USE IN DECOMPOSING METALLIC SALTS AND DESULPHURIZING ORES.

SPECIFICATION forming part of Letters Patent No. 399,118, dated March 5, 1889.

Application filed January 3, 1889. Serial No. 295,364. (No model.)

*To all whom it may concern:*

Be it known that we, PHINEAS H. ADAMS, Jr., and ORSEMAS T. X. ADAMS, citizens of the United States, residing at Chicago, Illinois, have invented certain new and useful Improvements in Apparatus for Use in Decomposing Metallic Salts and Desulphurizing Ores, of which the following is a specification.

The object of our invention is to improve an apparatus for mechanically decomposing metallic salts and desulphurizing ores or their resulting material, when the substances treated are in a molten condition, by the action of centrifugal force; and our invention consists in the features and details of construction hereinafter described and claimed.

Figure 1:
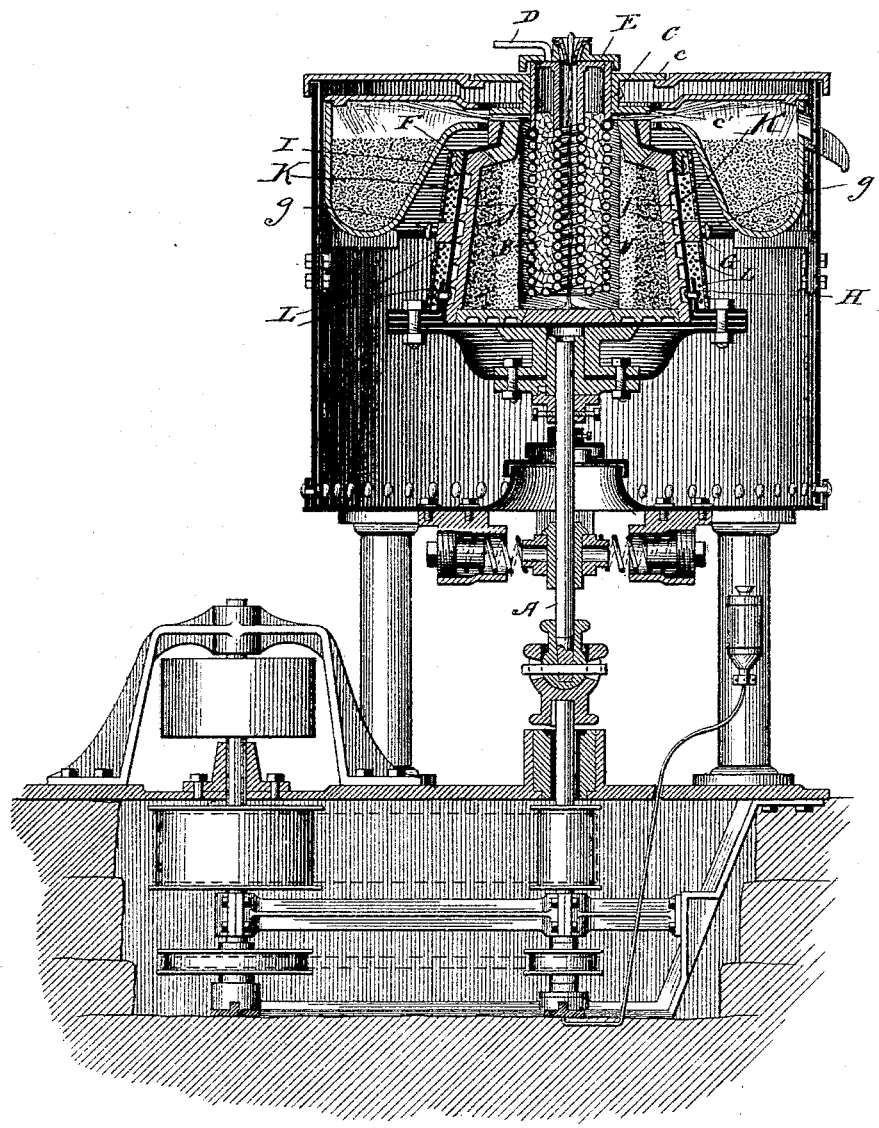
Figure 2:
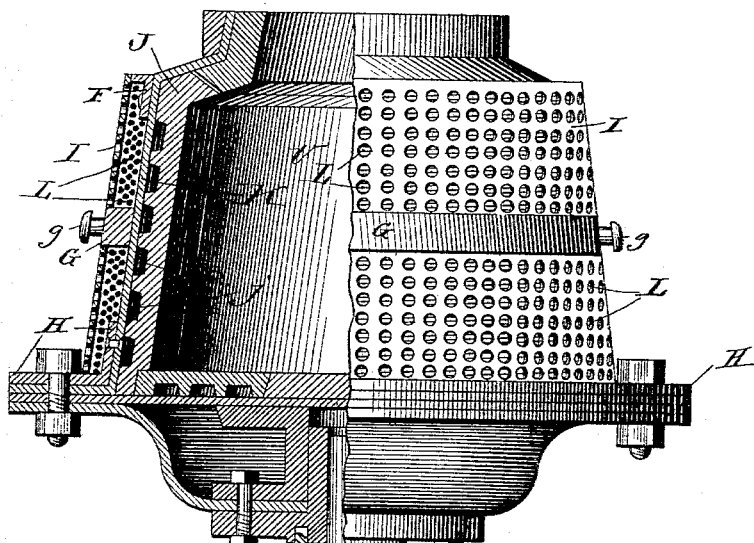
Figure 3:
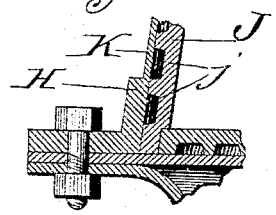

In the drawings, Figure 1 is a vertical section with the running-gear shown in elevation. Fig. 2 is an enlarged view of some of the parts of the receiving-vessel shown in Fig. 1; and Figs. 3, 4, and 5 are details of some of the parts.

In making our improved apparatus for decomposing chemical compounds, metallic salts, or salts of metal, and desulphurizing ores, we make a receiving-vessel, V, constructed and adapted to receive the substances to be treated when in a molten condition. This receiving-vessel is mounted and rests upon an actuating-shaft, A, to which it is fixed or keyed in such a way that by the rotation of the shaft the receiving-vessel will be revolved. The receiving-vessel may be made in such a way as will secure the required strength and reduce the conduction of heat from the interior to the exterior. It may be surrounded by a curbing and have a removable bottom, or be otherwise separable, preferably in the plane of its largest diameter, to facilitate the removal of the material not thrown off by the action of centrifugal force; and in other respects it may be made as will be calculated to subserve the end in view, and permit of its being rotated at a high rate of speed, for the separation of particles of different degrees of density in the matter treated. Many of these parts and the details of their construction, except as hereinafter described, need not be more fully explained, as they will be sufficiently understood from an inspection of the drawings.

In order to supply heat to the interior of the receiving-vessel before it is set in operation, or to maintain a high temperature in it during intermissions of use, or for any other reason, we prefer to provide the receiving-vessel with a fire-pot, B, which is preferably made of a series of coiled tubes, through which water may be kept constantly circulating, as shown in Fig. 1 of the drawings, although any refractory material capable of withstanding the intense heat to which it will be subjected and possessed of the required strength may be used. This "fire-pot," as we have called it, may form simply an annular chamber, leaving a hole through the middle, through which the molten material may be poured or introduced into the receiving-vessel. This is the way we have shown it in the drawings. The upper portion of the fire-pot is preferably riveted, or otherwise fastened, to a ring, C, forming an angle-iron, or, in other words, to a ring with flanges extending out horizontally at its upper and lower edges. When made with two flanges, the upper portion, c, rests upon a lip or flange adapted to receive it in the general cover of the apparatus, while the lower flange, c', extends over the mouth of the receiving-vessel and forms a cover to the same. While we prefer to fasten the upper end of the fire-pot to a ring provided with these flanges, other means may be employed to support it in proper position, and the cover c' for the mouth of the receiving-vessel may be made independent of the ring C and supported in any convenient manner. The external diameter of the fire-pot is preferably enough smaller than the internal diameter of the mouth of the receiving-vessel as to leave a small annular space around the fire-pot, through which and between the top of the receiving-vessel and the cover c' the material thrown off by the action of the centrifugal force may be discharged as it constantly rises from the bottom of the vessel. A pipe, D, leading from a fan-blower or other blast, may be employed to drive a current or blast of air into the fuel-space of the fire-pot, so as to maintain combustion. The cover E of the fire-pot is also preferably made removable, to facilitate the introduction and removal of fuel, ashes, cinders, or other matter. As before described, the whole fire-pot may be entirely lifted out and removed from the receiving-vessel whenever it is desirable to do so.

Figure 4:
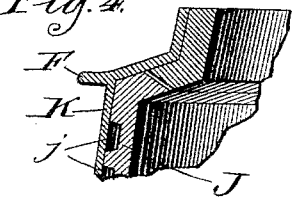
Figure 5:
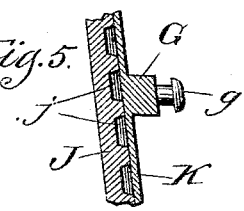

Around the top of the receiving-vessel we prefer to provide or fasten a ring, F, which may be riveted or otherwise fastened to the outside of the receiving-vessel, as shown in detail in Fig. 4; but this ring, instead of forming a distinct piece made separately and put on, may consist in a thickened portion integral with the outer shell or case of the receiving-vessel. It affords a shoulder or stop against which the cover or envelope of wire coiled around the receiving-vessel to increase its strength may be wrapped and firmly held from displacement. We also prefer to provide the receiving-vessel with a band or hoop, G, about half-way down from the top, as shown in detail in Fig. 5, which is secured to the receiving-vessel or formed integral therewith, and which is provided with studs g, which enable the receiving-vessel to be lifted out or handled by a bail or by hooks operated by a crane, or in any other convenient manner. Of course eyes or similar devices may be employed in the place of the studs g.

Around the bottom of the receiving-vessel we prefer to employ a re-enforcing piece, H, which may be described as a ring fitting around the outside of the shell or case for the receiving-vessel and provided with a flange extending out horizontally to enable it to be securely fastened or bolted to the bottom, as shown in Fig. 3; but of course this re-enforcing piece need not be a separate piece, as it is obvious that it may consist in a thickened portion of the shell or case of the receiving-vessel at its base and angle for the same purpose. It thus strengthens the receiving-vessel and assists in affording sufficient thickness to enable the bottom of the receiving-vessel to be securely bolted to its sides. This is the more important from the fact that the outside shell or case of the receiving-vessel—the one against which the wire is wrapped—may be made of thin or light material, while yet affording sufficient strength for the purpose if re-enforced, as it is, by the wire; but when light material is thus used the wire can only give it the requisite lateral strength against a lateral pressure, leaving it necessary, or at least advisable, to provide means to re-enforce it at the base and angle where it turns out, to secure it against the upward strain to which it is subjected. We therefore consider it quite important to provide the receiving-vessel with this flange or collar H. After wrapping the receiving-vessel with wire to as many layers or coils of thickness as may be desired we prefer to provide it with a light covering or jacket, I, which fits outside of the wire cover and protects the wire from being cut or broken when the receiving-vessel is moved about, and also prevents the unwinding of the wire should one of its strands become accidentally broken; but in order to permit the air to have access to the wire, and, if desired, for purposes of cooling the receiving-vessel, we prefer to provide the outer casing or jacket, I, with perforations, which will permit the access desired.

In constructing the receiving-vessel we prefer to make it with an outer shell or case, K, re-enforced and strengthened at the base and angle, and provided with a ring or shoulder at or near the top sustaining the wire, and a band or hoop affording means for handling the receiving-vessel, as above described, and with an inner lining, J, of a size and shape externally to fit within the shell or case. The outside of this lining is also preferably provided with grooves, channels, or indentations, forming spaces in the walls to reduce the conduction of heat from the interior to the exterior. We also prefer to strengthen the receiving-vessel by wrapping coils of wire L around the outer shell or case, and to protect the wire from injury by a cover or jacket, I. All of these features which enter into our preferred construction are plainly shown in Fig. 2.

What we regard as new, and desire to secure by Letters Patent, is—

1. In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, a depending fire-pot entering said vessel at the mouth, whereby said vessel may be supplied with heat, and means for rotating the actuating-shaft, substantially as described.

2. In an apparatus for decomposing metallic salts or salts of metals and desulphurizing ores when in a molten state, the combination of a revoluble receiving-vessel adapted to receive molten material to be treated, a revoluble actuating-shaft rotating said vessel as it revolves, a depending fire-pot entering said vessel at the mouth and provided with a hole or opening through it for the admission of molten material to said vessel, and means for rotating the actuating-shaft, substantially as described.

3. In an apparatus for decomposing metallic salts or salts of metals and desulphurizing ores when in a molten state, the combination of a revoluble receiving-vessel adapted to receive molten material to be treated, a cover or envelope of wire wrapped or coiled around said vessel, a covering or jacket protecting the wire, a revoluble actuating-shaft rotating said vessel as it revolves, and means for rotating the actuating-shaft, substantially as described.

4. In an apparatus for decomposing metallic salts or salts of metals and desulphurizing ores when in a molten state, the combination of a revoluble receiving-vessel adapted to receive molten material to be treated, a cover or envelope of wire wrapped or coiled around said vessel, a covering or jacket protecting the wire and provided with holes or perforations to admit air to the wire and permit the cooling of the exterior of the receiving-vessel, a revoluble actuating-shaft rotating said vessel as it revolves, and means for rotating the actuating-shaft, substantially as described.

5. In an apparatus for decomposing metallic salts or salts of metals and desulphurizing ores when in a molten state, the combination of a revoluble receiving-vessel adapted to receive molten material to be treated, a ring or shoulder around the receiving-vessel affording a stop for the upper coils of wire, a cover or envelope of wire wrapped or coiled around said vessel, a revoluble actuating-shaft rotating said vessel as it revolves, and means for rotating the actuating-shaft, substantially as described.

6. In an apparatus for decomposing metallic salts or salts of metals and desulphurizing ores when in a molten state, the combination of a revoluble receiving-vessel adapted to receive molten material to be treated, a band or hoop around the receiving-vessel enabling it to be removed or handled, a cover or envelope of wire wrapped or coiled around said vessel, a revoluble actuating-shaft rotating said vessel as it revolves, and means for rotating the actuating-shaft, substantially as described.

7. In an apparatus for decomposing metallic salts or salts of metals and desulphurizing ores when in a molten state, the combination of a revoluble receiving-vessel adapted to receive molten material to be treated, said vessel being specially re-enforced or strengthened at the base or angle of its shell or case, a cover or envelope of wire wrapped or coiled around said vessel, a revoluble actuating-shaft rotating said vessel as it revolves, and means for rotating the actuating-shaft, substantially as described.

PHINEAS H. ADAMS, JR.
ORSEMAS T. X. ADAMS.

Witnesses:
THOMAS A. BANNING,
EPHRAIM BANNING.